(12) United States Patent
Fujita et al.

(10) Patent No.: US 8,159,576 B2
(45) Date of Patent: Apr. 17, 2012

(54) SOLID STATE IMAGING DEVICE

(75) Inventors: Kazuki Fujita, Hamamatsu (JP); Ryuji Kyushima, Hamamatsu (JP); Harumichi Mori, Hamamatsu (JP); Masahiko Honda, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 194 days.

(21) Appl. No.: 12/675,824

(22) PCT Filed: Sep. 3, 2008

(86) PCT No.: PCT/JP2008/065869
§ 371 (c)(1),
(2), (4) Date: Mar. 19, 2010

(87) PCT Pub. No.: WO2009/031581
PCT Pub. Date: Mar. 12, 2009

(65) Prior Publication Data
US 2010/0245646 A1     Sep. 30, 2010

(30) Foreign Application Priority Data
Sep. 4, 2007   (JP) ................................ P2007-229218

(51) Int. Cl.
*H04N 3/14*   (2006.01)
*H04N 5/335*  (2011.01)

(52) U.S. Cl. ........ 348/294; 348/298; 348/302; 348/312; 348/308

(58) Field of Classification Search .......... 348/294–324; 250/208.1; 257/290–292
See application file for complete search history.

(56) References Cited

U.S. PATENT DOCUMENTS 7,015,844 B1 *   3/2006   Boemler ........................ 341/143

FOREIGN PATENT DOCUMENTS

| JP | 1-120970    | 5/1989  |
|----|-------------|---------|
| JP | 4-180374    | 6/1992  |
| JP | 2000-46645  | 2/2000  |
| JP | 2003-224776 | 8/2003  |
| JP | 2003-296722 | 10/2003 |
| JP | 2006-234557 | 9/2006  |

* cited by examiner

*Primary Examiner* — Yogesh Aggarwal
(74) *Attorney, Agent, or Firm* — Drinker Biddle & Reath LLP

(57) ABSTRACT

A solid state imaging device 1 includes a photodetecting section including M×N pixel portions $P_{1,1}$ to $P_{M,N}$ two-dimensionally arrayed in M rows and N columns, a signal readout section including integrating circuits $S_1$ to $S_N$ and holding circuits $H_1$ to $H_N$, and an initialization section including initialization switches $SW_{I,1}$ to $SW_{I,N}$. In response to a discharging control signal Reset, discharge switches $SW_2$ in the integrating circuits $S_n$ are temporarily closed and then opened, and thereafter, in response to an m-th row selecting control signal Vsel(m), the readout switches $SW_1$ of the pixel portions $P_{m,n}$ of the m-th row are closed for a first period. In this first period, in response to a hold control signal Hold, the input switches $SW_{31}$ of the holding circuits $H_n$ are switched from a closed state to an open state, and thereafter, in response to an initializing control signal Init, the initialization switches $SW_{I,n}$ are closed for a second period.

2 Claims, 3 Drawing Sheets

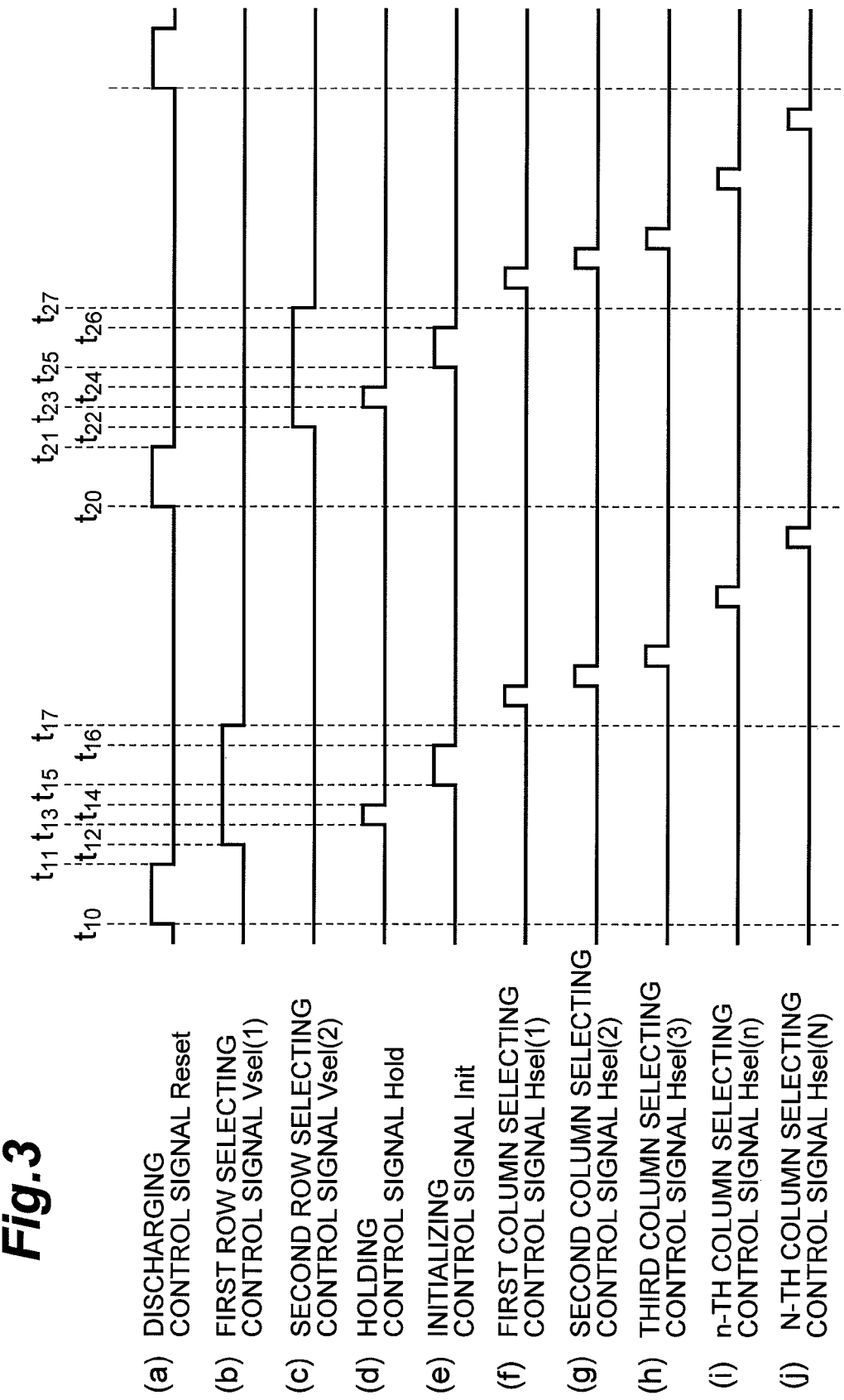

SOLID STATE IMAGING DEVICE

TECHNICAL FIELD

The present invention relates to a solid state imaging device.

BACKGROUND ART

Solid state imaging devices using the CMOS technique are known, and among these, a passive pixel sensor (PPS) type is known (refer to Patent Documents 1 and 2). The PPS type solid state imaging device includes PPS type pixel portions including photodiodes for generating charges as much as incident light intensities, two-dimensionally arrayed in M rows and N columns, and charges generated in the photodiode in each pixel portion according to light incidence are accumulated in a capacitive element in an integrating circuit, and a voltage corresponding to the accumulated charge amount is output.

Generally, output terminals of M pixel portions in each column are connected to an input terminal of an integrating circuit provided corresponding to the column via a readout wiring provided corresponding to the column. Then, from the respective first to M-th rows, charges generated in the photodiodes of the pixel portions are input in order into the corresponding integrating circuits through the corresponding readout wirings, and voltage values corresponding to the charge amounts are output from the integrating circuits.

The PPS type solid state imaging device is used for various purposes, and are combined with, for example, a scintillator panel and used as an X-ray flat panel for medical purposes and industrial purposes, and in detail, it is also used in an X-ray CT apparatus and a microfocus X-ray examination apparatus, etc. The solid state imaging device to be used for these purposes has a large-area photodetecting section in which M×N pixel portions are two-dimensionally arrayed, and may be integrated on a semiconductor substrate having a large size with sides more than 10 centimeters. Therefore, only one solid state imaging device may be produced from one semiconductor wafer.

Patent Document 1: Japanese Published Unexamined Patent Application No. 2006-234557
Patent Document 2: Japanese Published Unexamined Patent Application No. 2003-224776

DISCLOSURE OF THE INVENTION

Problem to be Solved by the Invention

In the solid state imaging device described above, when a readout wiring corresponding to any of the columns is broken during production, pixel portions closer to the integrating circuit than the broken point among the M pixel portions of the column are connected to the integrating circuit by the readout wiring, however, pixel portions farther from the integrating circuit than the broken point are not connected to the integrating circuit. Therefore, charges generated in the photodiodes according to light incidence in the pixel portions farther from the integrating circuit than the broken point are not read out to the integrating circuit, and are just accumulated in a junction capacitance portion of the corresponding photodiode.

When the amount of charges accumulated in the junction capacitance portion of the photodiode exceeds a saturation level, charges over the saturation level overflow to the neighboring pixel portions. Therefore, when one readout wiring is broken, this influences not only the pixel portions of the column connected to this readout wiring but also pixel portions of neighboring columns on both sides of the column in question, and eventually, defective lines occur with pixel portions of three consecutive columns.

When defective lines are not consecutive and the neighboring lines of one defective line are normal, pixel data of the defective line can be interpolated by using pixel data of the normal neighboring lines (refer to Patent Document 1). However, when defective lines occur with pixel portions of three consecutive columns, the above-described interpolation becomes difficult, so that the solid state imaging device is abolished as a defective. Particularly, there is a high probability that in the solid state imaging device having a large-area photodetecting section as described above, breakage of a wire is likely to occur due to long lengths of the readout wirings, and the production yield deteriorates.

The present invention was made in order to solve the above-described problems, and an object thereof is to provide a solid state imaging device in which, when a readout wiring connected to pixel portions of a certain column of the photodetecting section is broken, this breakage can be prevented from influencing the pixel portions of neighboring columns.

Means for Solving the Problems

A solid state imaging device of the present invention includes:

(1) a photodetecting section including M×N pixel portions $P_{1,1}$ to $P_{M,N}$ two-dimensionally arrayed in M rows and N columns, each including a photodiode which generates charges as much as an incident light intensity and a readout switch connected to the photodiode; (2) an m-th row selection wiring $L_{v,m}$ which supplies an m-th row selecting control signal for instructing opening and closing operations of the readout switches included in N pixel portions $P_{m,1}$ to $P_{m,N}$ of the m-th row in the photodetecting section to the readout switches; (3) a readout wiring $L_{O,n}$ which is connected to readout switches included in the M pixel portions $P_{1,n}$ to $P_{M,n}$ of the n-th column in the photodetecting section, extends between a first end and a second end, and reads out charges generated in a photodiode included in any of the M pixel portions $P_{1,n}$ to $P_{M,n}$ via the readout switch included in the pixel portion. M and N are integers not less than 2, m is integers not less than 1 and not more than M, and n is integers not less than 1 and not more than N.

The solid state imaging device of the present invention further includes: (4) an integrating circuit $S_n$ which has an input terminal connected to the first end of the readout wiring $L_{O,n}$, includes an integrating capacitive element and a discharge switch, discharges the integrating capacitive element when the discharge switch is closed, and accumulates charges input in the input terminal in the integrating capacitive element when the discharge switch is open, and outputs a voltage value corresponding to the accumulated charge amount in the integrating capacitive element from an output terminal; (5) a discharge wiring which supplies a discharging control signal for instructing opening and closing operations of the discharge switches included in the integrating circuits $S_1$ to $S_N$ to the discharge switches; (6) a holding circuit $H_n$ which has an input terminal connected to the output terminal of the integrating circuit $S_n$, includes an input switch, a holding capacitive element, and an output switch, makes the holding capacitive element hold a voltage value input in the input terminal when the input switch switches from a closed state to an open state, and outputs a voltage value held in the holding capacitive element when the output switch is closed; and (7) a holding wiring which supplies a holding control signal for instructing opening and closing operations of the input switches included in the holding circuits $H_1$ to $H_N$ to the input switches.

The solid state imaging device of the present invention further includes: (8) an initialization switch $SW_{I,n}$ connected to the second end of the readout wiring $L_{O,n}$; (9) an initialization wiring which supplies an initializing control signal for instructing opening and closing operations of the initialization switches $SW_{I,1}$ to $SW_{I,N}$ to the initialization switches $SW_{I,1}$ to $SW_{I,N}$; (10) a voltage supply wiring which is connected to the readout wiring $L_{O,n}$ via the initialization switch $SW_{I,n}$, and supplies a predetermined voltage value to the readout wiring $L_{O,n}$; and (11) a controlling section which outputs the m-th row selecting control signal to the m-th row selection wiring $L_{V,m}$, outputs the discharging control signal to the discharge wiring, outputs the holding control signal to the holding wiring, and outputs the initializing control signal to the initialization wiring.

The predetermined voltage value is set to a value capable of initializing accumulated charges in a junction capacitance portion of a photodiode included in each pixel portion $P_{m,n}$ when it is supplied to one terminal of the photodiode. This predetermined voltage value may be supplied to the voltage supply wiring from a circuit inside the solid state imaging device, or may be supplied to the voltage supply wiring from the outside of the solid state imaging device.

Further, the controlling section included in the solid state imaging device of the present invention (a) instructs temporary closing and then opening of the discharge switches included in the integrating circuits $S_1$ to $S_N$ by the discharging control signal, and then (b) instructs closing of the readout switches included in N pixel portions $P_{m,1}$ to $P_{m,N}$ of the m-th row in the photodetecting section for a first period by the m-th row selecting control signal, and (c) in the first period, instructs switching of input switches included in the holding circuits $H_1$ to $H_N$ from a closed state to an open state by the holding control signal, and instructs closing of the initialization switches $SW_{I,1}$ to $SW_{I,N}$ for a second period by the initializing control signal.

The solid state imaging device of the present invention operates as follows when reading out charges in N pixel portions $P_{m,1}$ to $P_{m,N}$ of the m-th row among the M×N pixel portions $P_{1,1}$ to $P_{M,N}$ two-dimensionally arrayed in M rows and N columns in the photodetecting section.

That is, in response to a discharging control signal output from the controlling section to a discharge wiring, in each integrating circuit $S_n$, the discharge switch temporarily closes and then opens to discharge the integrating capacitive element. Thereafter, in response to an m-th row selecting control signal output from the controlling section to the m-th row selection wiring $L_{V,m}$, the readout switch included in each pixel portion $P_{m,n}$ of the m-th row closes for the first period, and charges generated in the photodiode of the pixel portion $P_{m,n}$ and accumulated in the junction capacitance portion until then are transferred to and accumulated in the integrating capacitive element of the integrating circuit $S_n$, through the readout switch of the pixel portion $P_{m,n}$ and the readout wiring $L_{O,n}$. At this time, the accumulated charges in the junction capacitance portion of the photodiode of the pixel portion $P_{m,n}$ are initialized. Then, a voltage value corresponding to the amount of charges accumulated in the integrating capacitive element of each integrating circuit $S_n$ is output from the output terminal of the integrating circuit $S_n$.

In the first period during which the readout switch included in each pixel portion $P_{m,n}$ of the m-th row closes, in response to a holding control signal output from the controlling section to the holding wiring, the input switch switches from a closed state to an open state in each holding circuit $H_n$, and a voltage value output from the output terminal of the integrating circuit $S_n$ and input in the input terminal of the holding circuit $H_n$ at this time is held in the holding capacitive element $C_3$. Further, in the first period, after voltage value holding by each holding circuit $H_n$, in response to an initializing control signal output from the controlling section to the initialization wiring, each initialization switch $SW_{I,n}$ closes for the second period, and a voltage value input in the voltage supply wiring is supplied to one terminal of the photodiode of the pixel portion $P_{m,n}$ through the initialization switch $SW_{I,n}$, the readout wiring $L_{O,n}$, and the readout switch of the pixel portion $P_{m,n}$. After voltage value holding by each holding circuit $H_n$, the voltage value held in each holding circuit $H_n$ (or a voltage value corresponding to this held voltage value) is output through the output switch.

When a certain n-th column readout wiring $L_{O,n}$ is broken at a point halfway, pixel portions farther from the integrating circuit $S_n$ than the broken point among M pixel portions $P_{1,n}$ to $P_{M,n}$ of the n-th column are not connected to the integrating circuit $S_n$ and cannot transfer charges to the integrating circuit $S_n$, so that initialization of the accumulated charges in the junction capacitance portion of the photodiode by this charge transfer is impossible.

Therefore, in the present invention, in the first period during which the readout switch included in each pixel portion $P_{m,n}$ of the m-th row closes, each initialization switch $SW_{I,n}$ closes for the second period after voltage value holding by the holding circuit $H_n$, and accordingly, a voltage value input in the voltage supply wiring is supplied to one terminal of the photodiode of the pixel portion $P_{m,n}$ through the initialization switch $SW_{I,n}$, the readout wiring $L_{O,n}$, and the readout switch of the pixel portion $P_{m,n}$. The voltage value supplied to one terminal of the photodiode is set to a value capable of initializing the accumulated charges in the junction capacitance portion of the photodiode included in each pixel portion $P_{m,n}$. Accordingly, even in the pixel portions farther from the integrating circuit $S_n$ than the broken point, accumulated charges in the junction capacitance portions of the photodiodes can be initialized.

Further, in the solid state imaging device of the present invention, it is preferable that the photodetecting section, the initialization switches $SW_{I,1}$ to $SW_{I,N}$, the row selection wirings $L_{V,1}$ to $L_{V,M}$, the readout wirings $L_{O,1}$ to $L_{O,N}$, the initialization wiring and the voltage supply wiring are integrated on a substrate, and in this case, it is preferable that the voltage supply wiring is thicker than the readout wirings $L_{O,n}$. Accordingly, the voltage supply wiring is hardly broken, and decrease in the voltage value to be supplied to the photodiode of the pixel portion $P_{m,n}$ when the initialization switch $SW_{I,n}$ closes can be reduced.

Effects of the Invention

In a solid state imaging device of the present invention, when a readout wiring connected to pixel portions of a certain column of a photodetecting section is broken, influence of the breakage on pixel portions of neighboring columns can be avoided.

BRIEF DESCRIPTION OF THE DRAWINGS

FIG. 3 is a timing chart describing operations of the solid state imaging device 1 of the present embodiment.

DESCRIPTION OF REFERENCE NUMERALS

Figure 1:
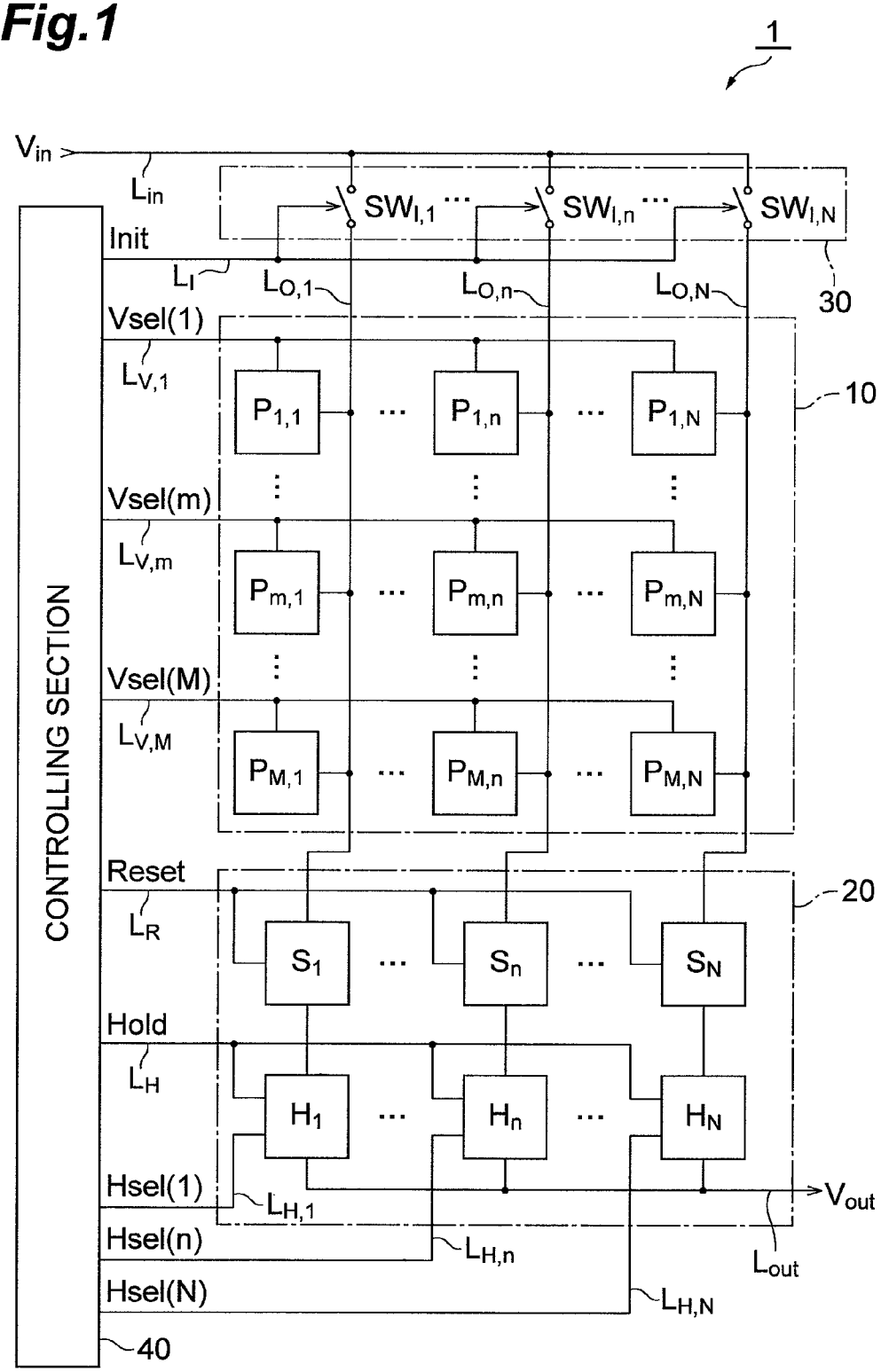
FIG. 1 is a schematic configuration view of a solid state imaging device 1 of a present embodiment.

1: Solid state imaging device
10: Photodetecting section
20: Signal readout section
30: Initialization section
40: Controlling section
$P_{1,1}$ to $P_{M,N}$: Pixel portion
PD: Photodiode
$SW_1$: Readout switch
$S_1$ to $S_N$: Integrating circuit
$C_2$: Integrating capacitive element
$SW_2$: Discharge switch
$A_2$: Amplifier
$H_1$ to $H_N$: Holding circuit
$C_3$: Holding capacitive element
$SW_{31}$: Input switch
$SW_{32}$: Output switch
$SW_{I,1}$ to $SW_{I,N}$: Initialization switch
$L_{V,m}$: m-th row selection wiring
$L_{H,n}$: n-th column selection wiring
$L_{O,n}$: n-th column readout wiring
$L_R$: discharge wiring
$L_H$: Holding wiring
$L_I$: Initialization wiring
$L_{in}$: Voltage supply wiring
$L_{out}$: Voltage output wiring

BEST MODES FOR CARRYING OUT THE INVENTION

Hereinafter, a best mode for carrying out the present invention will be described with reference to the accompanying drawings. In the description of the drawings, the same components will be designated with the same reference numerals, and overlapping description will be omitted.

FIG. 1 is a schematic configuration view of the solid state imaging device 1 of the present embodiment. The solid state imaging device 1 of the present embodiment includes a photodetecting section 10, a signal readout section 20, an initialization section 30, and a controlling section 40. When the solid state imaging device is used as an X-ray flat panel, a scintillator panel not shown is overlaid on the photodetecting section 10 of the solid state imaging device 1.

The photodetecting section 10 includes M×N pixel portions $P_{1,1}$ to $P_{M,N}$ two-dimensionally arrayed in M rows and N columns. A pixel portion $P_{m,n}$ is positioned on the m-th row in the n-th column. Here, M and N are integers not less than 2, and m is integers not less than 1 and not more than M, and n is integers not less than 1 and not more than N. The pixel portions $P_{m,n}$ are the PPS type, and have a common configuration.

N pixel portions $P_{m,1}$ to $P_{m,N}$ of the m-th row are connected to the controlling section 40 by an m-th row selection wiring $L_{V,m}$. Output terminals of M pixel portions $P_{1,n}$ to $P_{M,n}$ of the n-th column are connected to the integrating circuit $S_n$ included in the signal readout section 20 by an n-th column readout wiring $L_{O,n}$, and further connected to one end of an initialization switch $SW_{I,n}$ included in the initialization section 30. Specifically, a first end of the n-th column readout wiring $L_{O,n}$ is connected to the input terminal of the integrating circuit $S_n$, a second end of the n-th column readout wiring $L_{O,n}$ is connected to one end of the initialization switch $SW_{I,n}$, and the n-th column readout wiring $L_{O,n}$ extends between the first end and the second end.

The signal readout section 20 includes N integrating circuits $S_1$ to $S_N$ and N holding circuits $H_1$ to $H_N$. The integrating circuits $S_n$ have a common configuration. The holding circuits $H_n$ have a common configuration.

Each integrating circuit $S_n$ has an input terminal connected to the first end of the readout wiring $L_{O,n}$, and accumulates charges input in this input terminal and outputs a voltage value corresponding to the accumulated charge amount from an output terminal to the holding circuit $H_n$. N integrating circuits $S_1$ to $S_N$ are connected to the controlling section 40 by a discharge wiring $L_R$.

Each holding circuit $H_n$ has an input terminal connected to the output terminal of the integrating circuit $S_n$, and holds a voltage value input in this input terminal and outputs the held voltage value from an output terminal to an output wiring $L_{out}$. N holding circuits $H_1$ to $H_N$ are connected to the controlling section 40 by a holding wiring $L_H$. Each holding circuit $H_n$ is connected to the controlling section 40 by an n-th column selection wiring $L_{H,n}$.

The initialization section 30 includes N initialization switches $SW_{I,1}$ to $SW_{I,N}$. One end of each initialization switch $SW_{I,n}$ is connected to the n-th column readout wiring $L_{O,n}$. The other end of each N initialization switch $SW_{I,n}$ is connected to a voltage supply wiring $L_{in}$. Each initialization switch $SW_{I,n}$ determines whether it will electrically connect the voltage supply wiring $L_{in}$ and the n-th column readout wiring $L_{O,n}$ to each other by opening or closing in response to an initializing control signal Init supplied through an initialization wiring $L_I$ from the controlling section 40.

The controlling section 40 outputs an m-th row selecting control signal Vsel(m) to the m-th row selection wiring $L_{V,m}$ to supply this m-th row selecting control signal Vsel(m) to N pixel portions $P_{m,1}$ to $P_{m,N}$ of the m-th row. M row selecting control signals Vsel(1) to Vsel(M) are successively set to significant values. The controlling section 40 outputs an n-th column selecting control signal Hsel(n) to the n-th column selection wiring $L_{H,n}$ to supply this n-th column selecting control signal Hsel(n) to the holding circuit $H_n$. N column selecting control signals Hsel(1) to Hsel(N) are also successively set to significant values.

The controlling section 40 outputs a discharging control signal Reset to the discharge wiring $L_R$ to supply this discharging control signal Reset to the N integrating circuits $S_1$ to $S_N$. The controlling section 40 outputs a holding control signal Hold to the holding wiring $L_H$ to supply this holding control signal Hold to the N holding circuits $H_1$ to $H_N$. The controlling section 40 outputs an initializing control signal Init to the initialization wiring $L_1$ to supply this initializing control signal Init to the N initialization switches $SW_{I,1}$ to $SW_{I,N}$.

Figure 2:
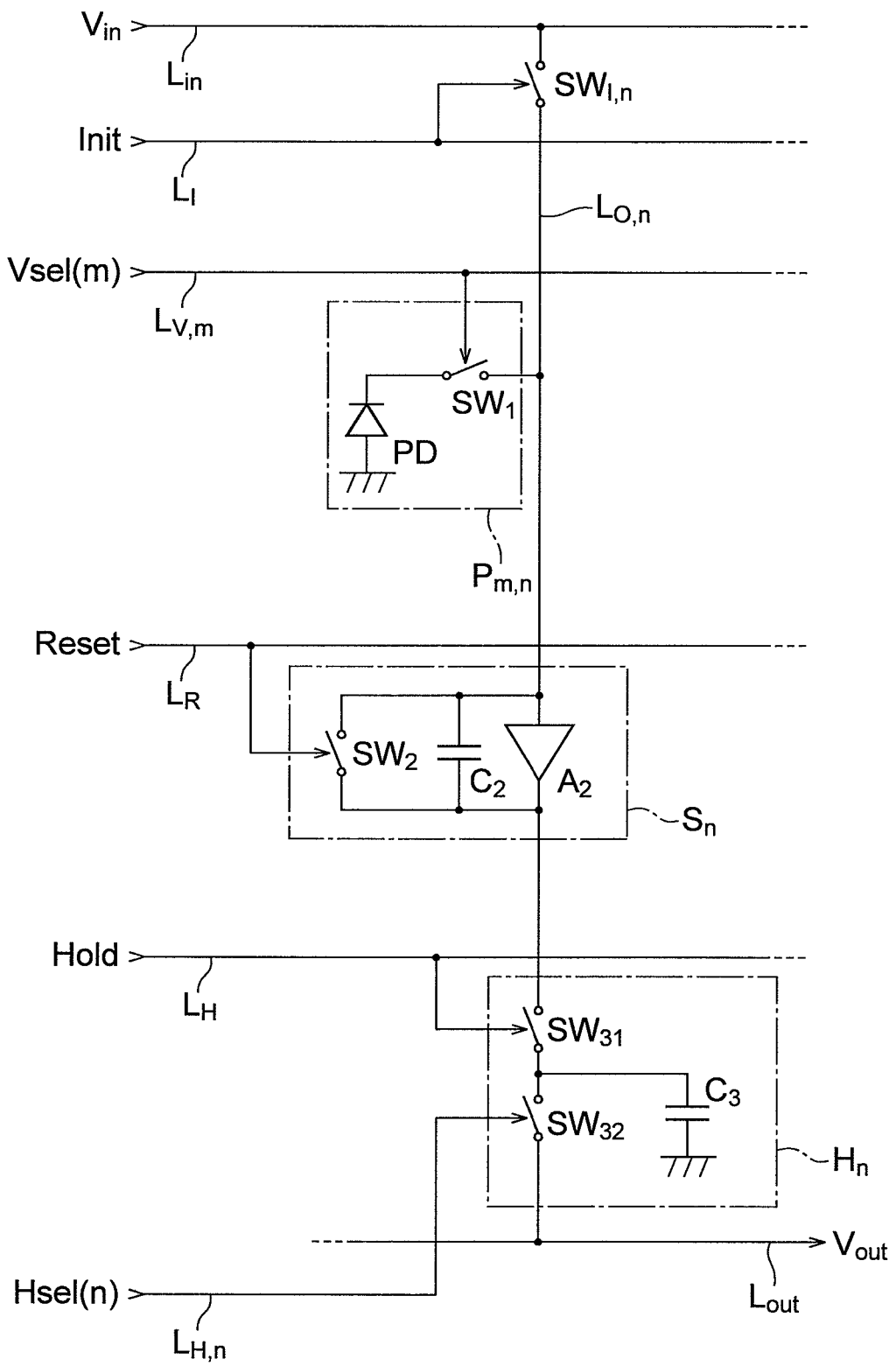
FIG. 2 is a circuit diagram of a pixel portion $P_{m,n}$, an integrating circuit $S_n$, a holding circuit $H_n$, and an initialization switch $SW_{I,n}$ included in the solid state imaging device 1 of the present embodiment.

FIG. 2 is a circuit diagram of the pixel portion $P_{m,n}$, the integrating circuit $S_n$, the holding circuit $H_n$, and the initialization switch $SW_{I,n}$ included in the solid state imaging device 1 of the present embodiment. Here, a circuit diagram of the pixel portion $P_{m,n}$ as a representative of the M×N pixel portions $P_{1,1}$ to $P_{M,N}$ is shown, a circuit diagram of an integrating circuit $S_n$ as a representative of the N integrating circuits $S_1$ to $S_N$ is shown, a circuit diagram of a holding circuit $H_n$ as a representative of the N holding circuit $H_1$ to $H_N$ is shown, and an initialization switch $SW_{I,n}$ as a representative of the N initialization switches $SW_{I,1}$ to $SW_{I,N}$ are shown. That is, circuit portions relating to a pixel portion $P_{m,n}$ on the m-th row in the n-th column and the n-th column readout wiring $L_{O,n}$ are shown.

The pixel portion $P_{m,n}$ includes a photodiode PD and a readout switch $SW_1$. The anode terminal of the photodiode PD is grounded, and the cathode terminal of the photodiode PD is connected to the n-th column readout wiring $L_{O,n}$ via the readout switch $SW_1$. The photodiode PD generates charges as much as an incident light intensity, and accumulates the generated charges in a junction capacitance portion. The readout switch $SW_1$ is supplied with an m-th row selecting control signal which passed through the m-th row selection wiring $L_{V,m}$ from the controlling section 40. The m-th row selecting control signal instructs opening and closing operations of the readout switches $SW_1$ included in the N pixel portions $P_{m,1}$ to $P_{m,N}$ of the m-th row in the photodetecting section 10.

In this pixel portion $P_{m,n}$, when the m-th row selecting control signal Vsel(m) is at low level, the readout switch $SW_1$ opens, and charges generated in the photodiode PD are not output to the n-th column readout wiring $L_{O,n}$ but are accumulated in the junction capacitance portion. On the other hand, when the m-th row selecting control signal Vsel(m) is at high level, the readout switch $SW_1$ closes, and charges generated in the photodiode PD and accumulated in the junction capacitance portion until then are output to the n-th column readout wiring $L_{O,n}$ through the readout switch $SW_1$.

The n-th column readout wiring $L_{O,n}$ is connected to the readout switches $SW_1$ included in M pixel portions $P_{1,n}$ to $P_{M,n}$ of the n-th column in the photodetecting section 10. The n-th column readout wiring $L_{O,n}$ reads out charges generated in the photodiode PD included in any of the M pixel portions $P_{1,n}$ to $P_{M,n}$ via the readout switch $SW_1$ included in this pixel portion and transfers the charges to the integrating circuit $S_n$.

The integrating circuit $S_n$ includes an amplifier $A_2$, an integrating capacitive element $C_2$, and a discharge switch $SW_2$. The integrating capacitive element $C_2$ and the discharge switch $SW_2$ are connected in parallel to each other, and provided between an input terminal and an output terminal of the amplifier $A_2$. The input terminal of the amplifier $A_2$ is connected to the n-th column readout wiring $L_{O,n}$. The discharge switch $SW_2$ is supplied with a discharging control signal Reset which passed through the discharge wiring $L_R$ from the controlling section 40. The discharging control signal Reset instructs opening and closing operations of the discharge switches $SW_2$ included in the N integrating circuits $S_1$ to $S_N$.

In this integrating circuit $S_n$, when the discharging control signal Reset is at high level, the discharge switch $SW_2$ closes, the integrating capacitive element $C_2$ is discharged, and a voltage value to be output from the integrating circuit $S_n$ is initialized. When the discharging control signal Reset is at low level, the discharge switch $SW_2$ opens, charges input in the input terminal are accumulated in the integrating capacitive element $C_2$, and a voltage value corresponding to the accumulated charge amount is output from the integrating circuit $S_n$.

The holding circuit $H_n$ includes an input switch $SW_{31}$, an output switch $SW_{32}$, and a holding capacitive element $C_3$. One end of the holding capacitive element $C_3$ is grounded. The other end of the holding capacitive element $C_3$ is connected to the output terminal of the integrating circuit $S_r$, via the input switch $SW_{31}$, and connected to the voltage output wiring $L_{out}$ via the output switch $SW_{32}$. The input switch $SW_{31}$ is supplied with a holding control signal Hold which passed through the holding wiring $L_H$ from the controlling section 40. The holding control signal Hold instructs opening and closing operations of the input switches $SW_{31}$ included in N holding circuits $H_1$ to $H_N$. The output switch $SW_{32}$ is supplied with an n-th column selecting control signal Hsel(n) which passed through the n-th column selection wiring $L_{H,n}$ from the controlling section 40. The n-th column selecting control signal Hsel(n) instructs opening and closing operations of the output switch $SW_{32}$ included in the holding circuit $H_n$.

In this holding circuit $H_n$, when the holding control signal Hold switches from high level to low level, the input switch $SW_{31}$ switches from a closed state to an open state, and a voltage value input in the input terminal at this time is held at the holding capacitive element $C_3$. When the n-th column selecting control signal Hsel(n) is at high level, the output switch $SW_{32}$ closes and the voltage value held in the holding capacitive element $C_3$ is output to the voltage output wiring $L_{out}$.

On end of the initialization switch $SW_{I,n}$ is connected to the readout wiring $L_{O,n}$, and the other end of the initialization switch $SW_{I,n}$ is connected to the voltage supply wiring $L_{in}$. The initialization switch $SW_{I,n}$ is supplied with an initializing control signal Init which passed through the initialization wiring $L_I$ from the controlling section 40. The initializing control signal Init instructs opening and closing operations of the N initialization switches $SW_{I,1}$ to $SW_{I,N}$.

The voltage supply wiring $L_{in}$ is connected to the readout wiring $L_{O,n}$ via the initialization switch $SW_{I,n}$, and supplies a predetermined voltage value $V_{in}$ to the readout wiring $L_{O,n}$. This voltage value $V_{in}$ is set to a value capable of initializing the accumulated charges in the junction capacitance portion of the photodiode PD included in each pixel portion $P_{m,n}$ when it is supplied to the cathode terminal of the photodiode PD.

When outputting voltage values corresponding to received light intensities in the N pixel portions $P_{m,1}$ to $P_{m,N}$ of the m-th row in the photodetecting section 10, the controlling section 40 instructs temporary closing and then opening of the discharge switches $SW_2$ included in the N integrating circuits $S_1$ to $S_N$ by a discharging control signal Reset, and then instructs closing of the readout switches $SW_1$ included in the N pixel portions $P_{m,1}$ to $P_{m,N}$ of the m-th row in the photodetecting section 40 for a first period by an m-th row selecting control signal Vsel(m). In this first period, the controlling section 40 instructs switching of the input switches $SW_{31}$ included in the N holding circuits $H_1$ to $H_N$ from a closed state to an open state by a holding control signal Hold, and then instructs closing of the N initialization switches $SW_{I,1}$ to $SW_{I,N}$ included in N holding circuits $H_1$ to $H_N$ for a second period by an initializing control signal Init. Then, the controlling section 40 instructs successive closing of the output switches $SW_{32}$ included in the N holding circuits $H_1$ to $H_N$ for a predetermined period by column selecting control signals Hsel(1) to Hsel(N) after the first period. The controlling section 40 performs this control for the respective rows in order.

Next, operations of the solid state imaging device 1 of the present embodiment will be described. In the solid state imaging device 1 of the present embodiment, according to level changes of the M row selecting control signals Vsel(1) to Vsel(M), the N column selecting control signals Hsel(1) to Hsel(N), the discharging control signal Reset, the holding control signal Hold, and the initializing control signal Init at predetermined timings under control by the controlling section 40, light made incident on the photodetecting section 10 can be imaged.

FIG. 3 is a timing chart describing operations of the solid state imaging device 1 of the present embodiment. This figure shows, in order from the top, (a) the discharging control signal Reset for instructing opening and closing operations of the discharge switches $SW_2$ included in the N integrating circuits $S_1$ to $S_N$, (b) the first row selecting control signal Vsel(1) for instructing opening and closing operations of the readout switches $SW_1$ included in the N pixel portions $P_{1,1}$ to $P_{1,N}$ of the first row in the photodetecting section 10, (c) the second row selecting control signal Vsel(2) for instructing opening and closing operations of the readout switches $SW_1$ included in the N pixel portions $P_{2,1}$ to $P_{2,N}$ of the second row in the photodetecting section 10, (d) the holding control signal Hold for instructing opening and closing operations of the input switches $SW_{31}$ included in the N holding circuits $H_1$ to $H_N$, and (e) the initializing control signal Init for instructing opening and closing operations of the N initialization switches $SW_{I,1}$ to $SW_{I,N}$.

This figure further subsequently shows, in order, (f) the first column selecting control signal Hsel(1) for instructing opening and closing operations of the output switch $SW_{32}$ included in the holding circuit $H_1$, (g) the second column selecting control signal Hsel(2) for instructing opening and closing operations of the output switch $SW_{32}$ included in the holding circuit $H_2$, (h) the third column selecting control signal Hsel(3) for instructing opening and closing operations of the output switch $SW_{32}$ included in the holding circuit $H_3$, (i) the n-th column selecting control signal Hsel(n) for instructing opening and closing operations of the output switch $SW_{32}$ included in the holding circuit $H_n$, and (j) the N-th column selecting control signal Hsel(N) for instructing opening and closing operations of the output switch $SW_{32}$ included in the holding circuit $H_N$.

Charges generated in the photodiodes PD included in the N pixel portions $P_{1,1}$ to $P_{1,N}$ of the first row and accumulated in the junction capacitance portions are read out as follows. Before the time $t_{10}$, the M row selecting control signals Vsel(1) to Vsel(M), the N column selecting control signals Hsel(1) to Hsel(N), the discharging control signal Reset, the holding control signal Hold, and the initializing control signal Init are at low level.

During a period from the time $t_{10}$ to $t_{11}$, the discharging control signal Reset to be output from the controlling section 40 to the discharge wiring $L_R$ becomes high level, and accordingly, in the N integrating circuits $S_1$ to $S_N$, the discharge switches $SW_2$ close and the integrating capacitive elements $C_2$ are discharged. During a first period from the time $t_{12}$ after the time $t_{11}$ to the time $t_{17}$, the first row selecting control signal Vsel(1) to be output from the controlling section 40 to the first row selection wiring $L_{V,1}$ becomes high level, and accordingly, the readout switches $SW_1$ included in the N pixel portions $P_{1,1}$ to $P_{1,N}$ of the first row of the photodetecting section 10 close.

In this first period ($t_{12}$ to $t_{17}$), during a period from the time $t_{13}$ to the time $t_{14}$, the holding control signal Hold to be output from the controlling section 40 to the holding wiring $L_H$ becomes high level, and accordingly, the input switches $SW_{31}$ in the N holding circuits $H_1$ to $H_N$ close. During a second period from the time $t_{15}$ after the time $t_{14}$ to the time $t_{16}$, the initializing control signal Init to be output from the controlling section 40 to the initialization wiring $L_I$ becomes high level, and accordingly, the N initialization switches $SW_{I,1}$ to $SW_{I,N}$ close.

In the first period ($t_{12}$ to $t_{17}$), the readout switch $SW_1$ included in each pixel portion $P_{1,n}$ of the first row is closed and the discharge switch $SW_2$ of each integrating circuit $S_n$ is open, so that charges generated in the photodiode PD of each pixel portion $P_{1,n}$ and accumulated in the junction capacitance portion until then are transferred to and accumulated in the integrating capacitive element $C_2$ of the integrating circuit $S_n$ through the readout switch $SW_1$ of the pixel portion $P_{1,n}$ and the n-th column readout wiring $L_{O,n}$. Then, a voltage value corresponding to the amount of charges accumulated in the integrating capacitive element $C_2$ of each integrating circuit $S_n$ is output from the output terminal of the integrating circuit $S_n$.

At the time $t_{14}$ in the first period ($t_{12}$ to $t_{17}$), the holding control signal Hold switches from high level to low level, and accordingly, in each of the N holding circuits $H_1$ to $H_N$, the input switch $SW_{31}$ switches from a closed state to an open state, and a voltage value output from the output terminal of the integrating circuit $S_n$ and input in the input terminal of the holding circuit $H_n$ at this time is held by the holding capacitive element $C_3$.

During the second period ($t_{15}$ to $t_{16}$) in the first period ($t_{12}$ to $t_{17}$), the N initialization switches $SW_{I,1}$ to $SW_{I,N}$ close, and accordingly, the voltage value $V_{in}$ input in the voltage supply wiring $L_{in}$ is supplied to the cathode terminal of the photodiode PD of the pixel portion through the initialization switch $SW_{I,n}$, the readout wiring $L_{O,n}$, and the readout switch $SW_1$ of the pixel portion $P_{1,n}$.

Then, after the first period ($t_{12}$ to $t_{17}$), column selecting control signals Hsel(1) to Hsel(N) to be output from the controlling section 40 to the column selection wirings $L_{H,1}$ to $L_{H,N}$ successively become high level for a predetermined period, and accordingly, the output switches $SW_{32}$ included in the N holding circuits $H_1$ to $H_N$ successively close for the predetermined period, and the voltage values held in the holding capacitive elements $C_3$ of the holding circuits $H_n$ are successively output to the voltage output wiring $L_{out}$ through the output switches $SW_{32}$. The voltage values $V_{out}$ to be output to the voltage output wiring $L_{out}$ indicate the received light intensities received by the photodiodes PD included in the N pixel portions $P_{1,1}$ to $P_{1,N}$ of the first row.

Subsequently, charges generated in the photodiodes PD included in N pixel portions $P_{2,1}$ to $P_{2,N}$ of the second row and accumulated in the junction capacitance portions are read out as follows.

During the period from the time $t_{20}$ to the time $t_{21}$, the discharging control signal Reset to be output from the controlling section 40 to the discharge wiring $L_R$ becomes high level, and accordingly, in the N integrating circuits $S_1$ to $S_N$, the discharge switches $SW_2$ close, and the integrating capacitive elements $C_2$ are discharged. During the first period from the time $t_{22}$ after the time $t_{21}$ to the time $t_{27}$, the second row selecting control signal Vsel(2) to be output from the controlling section 40 to the second row selection wiring $L_{v,2}$ becomes high level, and accordingly, the readout switches $SW_1$ included in the N pixel portions $P_{2,1}$ to $P_{2,N}$ of the second row in the photodetecting section 10 close.

In this first period ($t_{22}$ to $t_{27}$), during the period from the time $t_{23}$ to the time $t_{24}$, the hold control signal Hold to be output from the controlling section 40 to the holding wiring $L_H$ becomes high level, and accordingly, input switches $SW_{31}$ in the N holding circuits $H_1$ to $H_N$ close. During the second period from the time $t_{25}$ after the time $t_{24}$ to the time $t_{26}$, the initializing control signal Init to be output from the controlling section 40 to the initialization wiring $L_I$ becomes high level, and accordingly, N initialization switches $SW_{I,1}$ to $SW_{I,N}$ close.

Then, after the first period ($t_{22}$ to $t_{27}$), column selecting control signals Hsel(1) to Hsel(N) to be output from the controlling section 40 to the column selection wirings $L_{H,1}$ to $L_{H,N}$ successively become high level for a predetermined period, and accordingly, the output switches $SW_{32}$ included in the N holding circuits $H_1$ to $H_N$ successively close for the predetermined period. Thus, voltage values $V_{out}$ indicating the received light intensities received by the photodiodes PD included in the N pixel portions $P_{2,1}$ to $P_{2,N}$ of the second row are output to the voltage output wiring $L_{out}$.

Thereafter, the same operation is performed for the third to the M-th rows. When the operation for the M-th row is finished, the same operation is performed again in order from the first row. By thus repeating the same operation with a predetermined period, voltage values $V_{out}$ indicating two-dimensional intensity distribution of an image of light received by the photodetecting section 10 are output to the voltage output wiring $L_{out}$.

In the operation example described above, after the first period during which the readout switches $SW_I$ included in the N pixel portions $P_{m,1}$ to $P_{m,N}$ of the m-th row are closed, voltage values held in the N holding circuits $H_1$ to $H_N$ are successively output to the voltage output wiring $L_{out}$. However, it is allowed that the operation of outputting the voltage value held in each holding circuit $H_n$ to the voltage output wiring $L_{out}$ is performed after the holding control signal Hold switches from high level to low level and the output voltage in the integrating circuit $S_n$ is accordingly held in the holding circuit $H_n$, and the output operation may be performed in the second period during which the N initialization switches $SW_{I,1}$ to $SW_{I,N}$ are closed.

In the first period during which the readout switches $SW_I$ included in the N pixel portions $P_{m,1}$ to $P_{m,N}$ of the m-th row are closed, charges generated in the photodiode PD of each pixel portion $P_{m,n}$ of the m-th row and accumulated in the junction capacitance portion are transferred to the integrating capacitive element $C_2$ of the integrating circuit $S_n$ through the readout switch $SW_1$ of the pixel portion $P_{m,n}$ and the n-th column readout wiring $L_{O,n}$. At this time, the accumulated charges in the junction capacitance portion of the photodiode PD of each pixel portion $P_{m,n}$ of the m-th row are initialized.

However, when a certain n-th column readout wiring $L_{O,n}$ is broken at a point halfway, among M pixel portions $P_{1,n}$ to $P_{M,n}$ of the n-th column, pixel portions farther from the integrating circuit $S_n$ than the broken point are not connected to the integrating circuit $S_n$ and cannot transfer charges to the integrating circuit $S_n$, so that initialization of the accumulated charges in the junction capacitance portions of the photodiodes PD by this charge transfer is impossible. If this goes on, charges generated in the photodiodes according to light incidence on these pixel portions are just accumulated in the junction capacitance portions of the photodiodes, and if the charges exceed the saturation level, they overflow to pixel portions in neighboring columns and cause defective lines in pixel portions of three consecutive columns.

Therefore, in the present embodiment, in the first period, by closing the N initialization switches $SW_{I,1}$ to $SW_{I,N}$ during the second period after the output voltage value of each integrating circuit $S_n$ is held by the holding circuit $H_n$, the voltage value $V_{in}$ input in the voltage supply wiring $L_{in}$ is supplied to the cathode terminal of the photodiode PD of the pixel portion $P_{m,n}$ through the initialization switch $SW_{I,n}$, the readout wiring $L_{O,n}$, and the readout switch $SW_1$ of the pixel portion $P_{m,n}$. Then, the voltage value $V_{in}$ to be supplied to the cathode terminal of the photodiode PD is set to a value capable of initializing the accumulated charges in the junction capacitance portion of the photodiode PD included in each pixel portion $P_{m,n}$.

Accordingly, even in pixel portions farther from the integrating circuit $S_n$ than the broken point, the accumulated charges in the junction capacitance portions of the photodiodes PD can be initialized. Therefore, charges generated in the photodiodes according to light incidence on these pixel portions are prevented from overflowing to pixel portions in neighboring columns, and occurrence of defective lines in pixel portions in three consecutive columns is also prevented. Specifically, when a readout wiring connected to pixel portions of a certain column of the photodetecting section 10 is broken, influence of the breakage on pixel portions in neighboring columns can be avoided. Even if one defective line occurs, neighboring lines are normal lines, so that pixel data of the defective line can be interpolated by using pixel data of the neighboring normal lines.

The solid state imaging device 1 of the present invention is preferably integrated on a substrate. Specifically, the photodetecting section 10 including M×N pixel portions $P_{1,1}$ to $P_{M,N}$, the initialization section 30 including N initialization switches $SW_{I,1}$ to $SW_{I,N}$, the row selection wirings $L_{V,1}$ to $L_{V,M}$, the readout wirings $L_{O,1}$ to $L_{O,N}$, the initialization wiring $L_I$, and the voltage supply wiring $L_{in}$ are preferably integrated on a semiconductor substrate. The signal readout section 20 including N integrating circuits $S_1$ to $S_N$ and N holding circuits $H_1$ to $H_N$, the discharge wiring $L_R$, the holding wiring $L_H$, the column selection wirings $L_{H,1}$ to $L_{H,N}$, and the voltage output wiring $L_{out}$ are also preferably integrated on the same substrate. The controlling section 40 may be provided separately from this substrate, however, preferably, the controlling section 40 is integrated on the same substrate.

In this case, in order to reduce the risk of breakage of the voltage supply wiring $L_{in}$ and make more reliable the above-described effects, the voltage supply wiring $L_{in}$ is preferably thicker than each readout wiring $L_{O,n}$. Generally, in order to reduce noise by reducing the input capacitance of the amplifier $A_2$ included in the integrating circuit $S_n$, the width of the readout wiring $L_{O,n}$ to be connected to the input terminal of the amplifier $A_2$ is preferably as narrow as possible, and is set to, for example, 1 micrometer. On the other hand, at the time of charge transfer from the pixel portion $P_{m,n}$ to the integrating circuit $S_n$, the initialization switch $SW_{I,n}$ is open, so that the voltage supply wiring $L_{in}$ is separated from the readout wiring $L_{O,n}$. Therefore, a thicker width of the voltage supply wiring $L_{in}$ is no problem, and can be set to, for example, approximately 5 to 10 micrometers. By increasing the width of the voltage supply wiring $L_{in}$, the voltage supply wiring $L_{in}$ is hardly broken, and decrease in the voltage value $V_{in}$ to be supplied to the cathode terminal of the photodiode PD of the pixel portion $P_{m,n}$ when the initialization switch $SW_{I,n}$ closes can be reduced.

Here, differences between the solid state imaging device 1 of the present embodiment and the solid state imaging device described in Patent Document 2 will be described. In the solid state imaging device shown in FIG. 2 and FIG. 3 of Patent Document 2, sensor cells 2-11 to 2-44 including signal transfer transistors 41, photodiodes 42, and reset transistors 43 are two-dimensionally arrayed, and the photodiodes 42 of the sensor cells 2-1n to 2-4n of the n-th column are connected to a vertical signal line 5-n via the signal transfer transistors 41, and a first end of the vertical signal line 5-n is connected to one end of the hold capacitance 7-n via the transfer transistor 6-n, and a second end of the vertical signal line 5-n is connected to one end of the reset circuit 1-n.

In comparison with the reset circuit 1-n in the solid state imaging device shown in FIG. 2 of Patent Document 2, the initialization switch $SW_{I,n}$ in the solid state imaging device 1 of the present embodiment is similar in respect to that it is provided on the side opposite to the connecting side of the signal readout section 20 (transfer transistor 6-n and hold capacitance 7-n, etc.) with respect to the readout wiring $L_{O,n}$ (vertical signal line 5-n), however, as described below, their purposes are different, and operations are also different.

The purpose and operation of the reset circuit 1-n in the solid state imaging device shown in FIG. 2 of Patent Document 2 are described in paragraphs [0026] and [0027] of Patent Document 2 as "previous to reading of each row (in detail, activation of the selection signal line), the vertical reset signal VRST for controlling the reset circuits 1 (1-1, 1-2, 1-3, 1-4) consisting of MOS transistors, etc., is switched to active level (H level), and the transfer signal line TRAN for controlling the transfer transistors 6 (6-1, 6-2, 6-3, 6-4) consisting of MOS transistors, etc., is switched to active level (H level), and accordingly, the vertical signal lines 5 (5-1, 5-2, 5-3, 5-4) and the hold capacitances 7 (7-1, 7-2, 7-3, 7-4) are reset. When the selection signal line (for example, 3-1) becomes active level and the transfer transistors 41 (see FIG. 3) are turned on, the sensor cells (for example, 2-11, 2-12, 2-13, 2-14) drive the vertical signal lines (5-1, 5-2, 5-3, 5-4), and voltage signals are transferred to the vertical signal lines 5."

Specifically, in the solid state imaging device 1 of the present embodiment, the initialization switch $SW_{I,n}$ is provided for initializing accumulated charges in the junction capacitance portion of the photodiode PD included in the pixel portion $P_{m,n}$, and on the other hand, in the solid state imaging device described in Patent Document 2, the reset circuit 1-n is provided for resetting accumulated charges in the parasitic capacitance of the vertical signal line 5-n and the hold capacitance 7-n, and the purposes of provision of the initialization switch $SW_{I,n}$ (reset circuit 1-n) are different. In the solid state imaging device 1 of the present embodiment, the initialization switch $SW_{I,n}$ switches to a closed state (ON state) after charges are read out from the pixel portions of each row, and on the other hand, in the solid state imaging device described in Patent Document 2, the reset circuit 1-n switches to a closed state (ON state) before charges are read out from the sensor cells of each row, so that the initialization switch $SW_{I,n}$ and the reset circuit 1-n have different operation timings.

As described above, in comparison with the solid state imaging device described in Patent Document 2, the solid state imaging device 1 of the present embodiment is similar in respect to that the initialization switch $SW_{I,n}$ (reset circuit 1-n) is provided, however, the purpose of the initialization switch is different and the operation is also different. Patent Document 2 does not contain description and suggestion about the breakage of the readout wiring $L_{O,n}$ (vertical signal line 5-n), let alone influence of the breakage and measure for avoiding influence of the breakage.

The invention claimed is:

1. A solid state imaging device comprising:
a photodetecting section including M×N pixel portions $P_{1,1}$ to $P_{M,N}$ two-dimensionally arrayed in M rows and N columns, each including a photodiode which generates charges as much as an incident light intensity and a readout switch connected to the photodiode;
an m-th row selection wiring $L_{V,m}$ which supplies an m-th row selecting control signal for instructing opening and closing operations of the readout switches included in N pixel portions $P_{m,1}$ to $P_{m,N}$ of the m-th row in the photodetecting section to the readout switches;
a readout wiring $L_{O,n}$ which is connected to readout switches included in the M pixel portions $P_{1,n}$ to $P_{M,n}$ of the n-th column in the photodetecting section, extends between a first end and a second end, and reads out charges generated in a photodiode included in any of the M pixel portions $P_{1,n}$ to $P_{M,n}$ via the readout switch included in the pixel portion;
an integrating circuit $S_n$ which has an input terminal connected to the first end of the readout wiring $L_{O,n}$, includes an integrating capacitive element and a discharge switch, discharges the integrating capacitive element when the discharge switch is closed, and accumulates charges input in the input terminal in the integrating capacitive element when the discharge switch is open, and outputs a voltage value corresponding to the accumulated charge amount in the integrating capacitive element from an output terminal;
a discharge wiring which supplies a discharging control signal for instructing opening and closing operations of the discharge switches included in the integrating circuits $S_1$ to $S_N$ to the discharge switches;
a holding circuit $H_n$ which has an input terminal connected to the output terminal of the integrating circuit $S_n$, includes an input switch, a holding capacitive element, and an output switch, makes the holding capacitive element hold a voltage value input in the input terminal when the input switch switches from a closed state to an open state, and outputs a voltage value held in the holding capacitive element when the output switch is closed;
a holding wiring which supplies a holding control signal for instructing opening and closing operations of the input switches included in the holding circuits $H_1$ to $H_N$ to the input switches;
an initialization switch $SW_{I,n}$ connected to the second end of the readout wiring $L_{O,n}$;
an initialization wiring which supplies an initializing control signal for instructing opening and closing operations of the initialization switches $SW_{I,1}$ to $SW_{I,N}$ to the initialization switches $SW_{I,1}$ to $SW_{I,N}$;
a voltage supply wiring which is connected to the readout wiring $L_{O,n}$ via the initialization switch $SW_{I,n}$, and supplies a predetermined voltage value to the readout wiring $L_{O,n}$; and
a controlling section which outputs the m-th row selecting control signal to the m-th row selection wiring $L_{V,m}$, outputs the discharging control signal to the discharge wiring, outputs the holding control signal to the holding wiring, and outputs the initializing control signal to the initialization wiring, provided that M and N are integers not less than 2, m is integers not less than 1 and not more than M, and n is integers not less than 1 and not more than N, wherein
the controlling section
instructs temporary closing and then opening of the discharge switches included in the integrating circuits $S_1$ to $S_N$ by the discharging control signal, and then
instructs closing of the readout switches included in N pixel portions $P_{m,1}$ to $P_{m,N}$ of the m-th row in the photodetecting section for a first period by the m-th row selecting control signal, and
in the first period, instructs switching of input switches included in the holding circuits $H_1$ to $H_N$ from a closed state to an open state by the holding control signal, and then instructs closing of the initialization switches $SW_{I,1}$ to $SW_{I,N}$ for a second period by the initializing control signal.

2. The solid state imaging device according to claim 1, wherein
the photodetecting section, the initialization switches $SW_{I,1}$ to $SW_{I,N}$, the row selection wirings $L_{V,1}$ to $L_{V,M}$, the readout wirings $L_{O,1}$ to $L_{O,N}$, the initialization wiring and the voltage supply wiring are integrated on a substrate, and
the voltage supply wiring is thicker than the readout wirings $L_{O,n}$.

* * * * *